United States Patent
Harmon (10) Patent No.: US 12,250,897 B2
(45) Date of Patent: Mar. 18, 2025

(54) REMOVABLE ROLLER WITH ROTATION INDICATOR

(71) Applicant: Deere & Company, Moline, IL (US)

(72) Inventor: Andrew W. Harmon, Davenport, IA (US)

(73) Assignee: Deere & Company, Moline, IL (US)

( * ) Notice: Subject to any disclaimer, the term of this patent is extended or adjusted under 35 U.S.C. 154(b) by 1068 days.

(21) Appl. No.: 17/085,829

(22) Filed: Oct. 30, 2020

(65) Prior Publication Data
US 2022/0132726 A1 May 5, 2022

(51) Int. Cl.
*A01C 7/10* (2006.01)
*A01C 15/00* (2006.01)

(52) U.S. Cl.
CPC ............ *A01C 7/102* (2013.01); *A01C 15/006* (2013.01)

(58) Field of Classification Search
CPC ....... A01C 7/127; A01C 7/102; A01C 15/006; A01C 7/123; A01C 19/02; A01C 7/16; A01C 7/18
See application file for complete search history.

(56) References Cited

U.S. PATENT DOCUMENTS

| | | | | |
|---|---|---|---|---|
| 6,598,548 B2 * | 7/2003 | Lempriere | ............. | A01C 19/02 111/178 |
| 11,746,880 B2 * | 9/2023 | Terada | ................... | F16H 57/031 74/606 R |
| 2010/0307394 A1 * | 12/2010 | Snipes | ................... | A01C 7/125 111/11 |
| 2015/0216109 A1 * | 8/2015 | Meyer | .................... | A01C 19/02 222/333 |
| 2020/0008345 A1 | 1/2020 | Gervais et al. | | |
| 2020/0217703 A1 * | 7/2020 | Schumacher | .......... | A01C 7/125 |

FOREIGN PATENT DOCUMENTS

DE  102007034997 A1  1/2009
EP  3662733 A1  6/2020

OTHER PUBLICATIONS

English translation of DE 10 2007 034 997, Anmelder, Oct. 5, 2023, https://translationportal.epo.org (Year: 2023).*
Extended European Search Report and Written Opinion issued in European Patent Application No. 21201761.0, dated Mar. 23, 2022, in 11 pages.
"ICon Metering System," Air Cart Operation, -en-na, Nov. 20, 2017, pp. 80-81.
"Fenix III seed meter," Vaderstad International website, Oct. 28, 2020, https://www.vaderstad.com/en/products/fenix-iii/.

* cited by examiner

*Primary Examiner* — Frederick C Nicolas
*Assistant Examiner* — Robert K Nichols, II
(74) *Attorney, Agent, or Firm* — Tucker Ellis LLP; Michael G. Craig (57) ABSTRACT

One or more techniques and/or systems are disclosed for metering assembly for an agricultural seeder. The metering assembly can be configured for quick and easy removal and replacement, where merely the assembly is removed without disassembling other parts of the seeder system. An improved coupler, in conjunction with a threaded knob device, allows for quick and easy access to the assembly, for removal and replacement in a metering tube. A visual indicator can be disposed on the end of a rotating shaft to provide a user with a quick confirmation that the assembly is properly rotating during operation.

16 Claims, 8 Drawing Sheets

REMOVABLE ROLLER WITH ROTATION INDICATOR

BACKGROUND

Agricultural seeders, such as air carts and other seeding work vehicles/devices, are configured for applying seed, fertilizer, and/or other particulate commodities to a field. Seeders typically include one or more containers and a metering system that meter out a predetermined quantity of the commodity from the container as the work vehicle moves across the field. These vehicles often include multiple meters that meter the commodity to a delivery system for delivering the commodity to one or more row units for delivery to the soil. The meters provide commodity output from the container at a desired rate for the desired purpose and scenario.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for a product (e.g., seed) metering assembly that can easily be installed and removed from a seeding distribution system (e.g., seeder). Further, the assembly has an indicator that allows for visual confirmation that the metering element of the assembly is actually operating. An improved coupling device allows for quick and easy removal and replacement of metering elements, and a knob device provides for the easy access to the assembly.

In one implementation of metering assembly for an agricultural seeder, a metering element comprises compartments that operably meters out a target commodity at a predetermined rate. Further, in this implementation, a coupler can be disposed at a rear end (e.g., second end) of the assembly that operably engages with a motor to receive rotational power. Additionally, a shaft can be operably, fixedly engaged with the coupler and the metering element, and the shaft rotates around a longitudinal axis. An indicator can be operably coupled with the shaft at a front end (e.g., a first end) of the assembly, where the indicator provides a visual indication of rotation of the shaft during rotation. A knob can be disposed at the front end of the assembly, where the shaft is rotationally disposed inside the knob at the front end, and wherein the knob is configured to selectably hold the assembly in the seeder during operation.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In one aspect, a device and system may be devised that comprises a separately removable metering roller assembly (e.g., comprising a knob, metering element, and coupler), which operably provides a visual indicator of operation. In this aspect, the metering roller assembly has a coupling with a metering apparatus that enables the metering roller assembly to be selectably removed and replaced, for example, without removing or deconstructing other portions of the metering apparatus. Further, the metering roller assembly can have a visual indicator that can visually indicate to a user that the element is actually rolling during operation. In that way, for example, a user may quickly view the metering roller assembly to see that it is properly operating, without needing to perform further testing or maintenance.

As an example, in this aspect, a user of a seeder vehicle may have a desire to visually determine that a metering roller is operating (e.g., rotating), in addition to computer indicators that a motor is turning. For example, during a static calibration of a seeder's metering rate, the user may stand alongside the machine with the meters turning with product dropping into a bag for recovery. During this operation, in this example, there may be no obvious sign that the metering motor is running, and the calibration bag can block the view of seed falling into the bag. Therefore, in this example, the user may wish to see an indicator on each metering roller assembly that visually indicates the metering element is rotating appropriately. Further, by providing a visual indicator on the metering roller assembly the user may not need to put themselves in a position that exposes them to moving machine parts.

Figure 1:
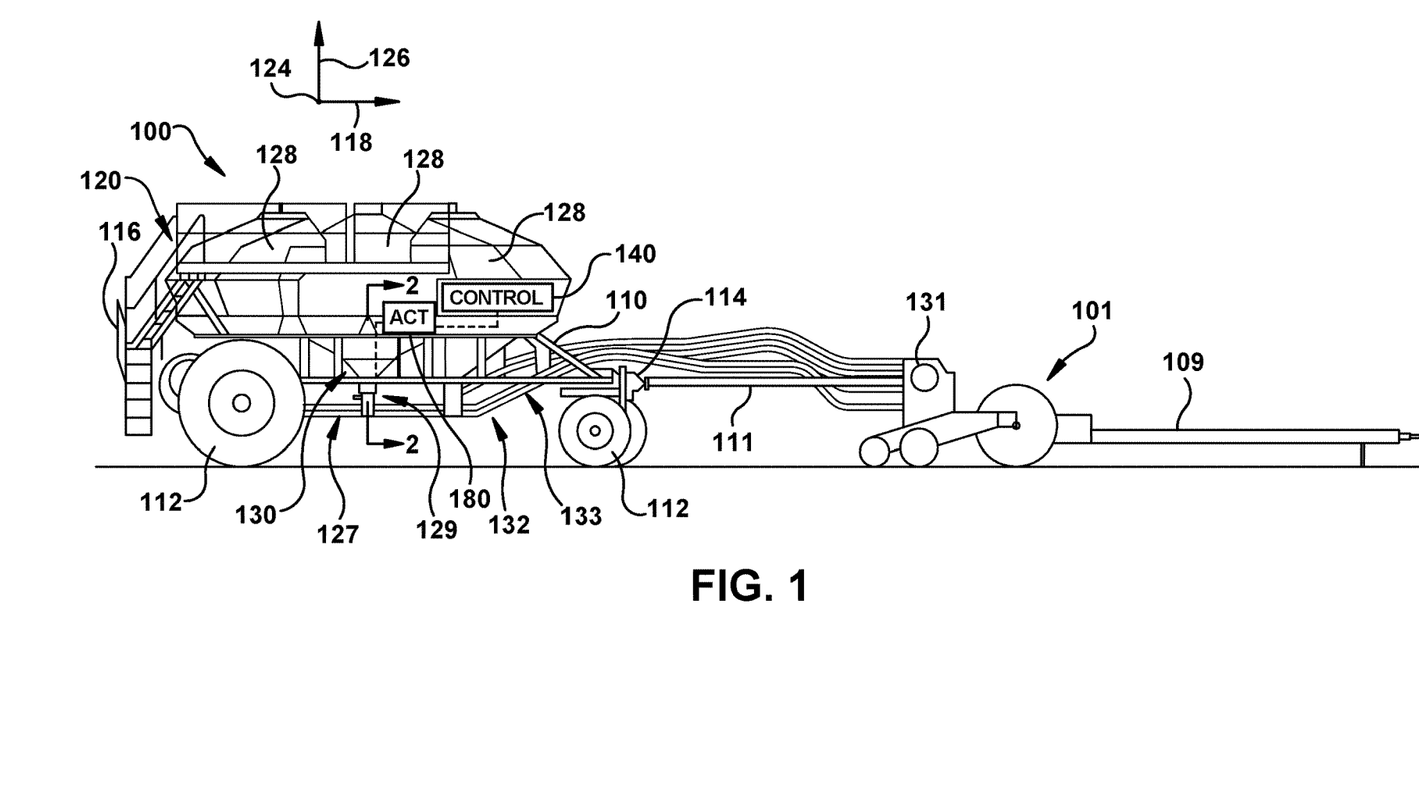
FIG. 1 is a component diagram illustrating one implementation of an example work vehicle according to example embodiments of the present disclosure.

FIG. 1 illustrates a work vehicle 100 according to example embodiments of the present disclosure. In the illustrated embodiment, the work vehicle 100 may be towed by another vehicle, such as a tractor (not shown). In other embodiments, the work vehicle 100 of the present disclosure may be a self-propelled vehicle. In some embodiments, the work vehicle 100 may be an air cart or air drill that contains a bulk amount of a commodity, which meters out the commodity from the bulk amount, and moves the metered commodity away from the work vehicle 100 for planting in the ground. In some embodiments, the commodity delivered from the work vehicle 100 may be metered further downstream before being planted. The work vehicle 100 shown in FIG. 1 is merely an example embodiment where one or more portions of the present disclosure may be implemented. One or more features of the present disclosure may be included on a different work vehicle, such as a planter, a commodity cart, or other work vehicle without departing from the scope of the present disclosure.

In this example, a longitudinal axis 118 (e.g., primary axis) is indicated in FIG. 1 for reference purposes. The longitudinal axis 118 may be substantially parallel to a direction of travel of the work vehicle 100. Thus, the longitudinal axis 118 may be parallel to a fore-aft axis of the work vehicle 100. A lateral axis 124 is also indicated in FIG. 1. The lateral axis 124 may be perpendicular to the longitudinal axis 118 and may extend between opposite lateral sides of the work vehicle 100. Furthermore, a vertical axis 126 is indicated in FIG. 1 for reference purposes. In some implementations, a control unit 140 can be used to control operations of one or more portions of the work vehicle 100. For example, the control unit may comprise one or more microprocessors that utilize commands and/or programs to operate the example work vehicle 100.

In some implementations, the work vehicle 100 may be configured for delivering the commodity to one or more row units 101. Each row unit 101 may include features for respectively tilling the soil, opening a furrow in the soil, depositing the commodity into the furrow, and closing the furrow. In some embodiments, the row units 101 may be connected together and arranged in series along the lateral axis 124. Thus, although only one row unit 101 is shown in FIG. 1, it will be appreciated that similar row units 101 may be included and disposed in series along the lateral axis 124. The row units 101 may be connected with the work vehicle 100 via a rear tow bar 111. The row units 101 may also be connected with the towing vehicle (e.g., tractor) via a forward tow bar 109. Accordingly, the row units 101 may be disposed between the work vehicle 100 and the towing vehicle with respect to the longitudinal axis 118. However, the row units 101 may be disposed behind the work vehicle 100 in some embodiments and/or the row units 101 may be directly connected with the work vehicle 100 (e.g., directly connected with the frame of the work vehicle 100) without departing from the scope of the present disclosure.

As shown in FIG. 1, the work vehicle 100 may include a frame 110 (e.g., chassis) and a plurality of wheels 112. The frame 110 may be assembled from rigid beams, bars, brackets, or other structures and may support the components as disclosed herein. The wheels 112 may support the frame 110 on terrain and enable movement of the vehicle 100 across the terrain. As shown, the frame 110 may extend between a front end 114 (e.g., first end) and a rear end 116 (e.g., second end) of the work vehicle 100. The tow bar 111 may extend from the frame 110 at the front end 114 for attaching the work vehicle 100 to the row units 101.

The work vehicle 100 may further include one or more commodity containers 128 (e.g., tanks, vessels, or other commodity source). The containers 128 may be supported on the frame 110. The commodity containers 128 may contain seed, fertilizer, and/or another particulate or granular commodity. Additionally, in some embodiments, the containers 128 may include a liquid commodity. There may be any number of containers 128. In the illustrated embodiment, for example, there are four commodity containers 128, one of which is hidden from view, and three (3) of which are not hidden from view.

Additionally, the work vehicle 100 may include at least one metering system 130. The metering system 130 may be a volumetric metering system. The metering system 130 may be configured to receive commodity from the commodity container 128 and may meter commodity to a downstream component. In some embodiments, the metering system 130 may be supported by the frame 110 and may be disposed generally underneath the commodity container(s) 128. The metering system 130 may include a plurality of metering roller assemblies (e.g., knob, element, shaft, and coupler) that actuate (e.g., rotate) to meter out the commodity from the commodity container 128. During operation, particles of the commodity within one of the containers 128 may move vertically downward toward the metering system 130. The metering system 130 may operate to meter out the commodity from the container 128 at a predetermined, controlled rate as the vehicle 100 moves across the field.

The work vehicle 100 may also include a delivery system 132. The delivery system 132 may include at least one delivery run 133. The delivery run(s) 133 may define a fluid pathway for delivery of the commodity away from the work vehicle 100. In some embodiments, a plurality of the runs 133 may include a respective run structure 127 (e.g., a primary tube or pipe) that is supported below the metering system 130. The run structures 127 may be rigid pipe segments that are fixed to the frame 110. The run structures 127 may be in fluid communication with downstream components (e.g., downstream pipe segments in the respective run 133, downstream manifolds, and/or the row units 101).

For example, the runs 133 may conduct a flow of air from the rear end 116 to the front end 114 and away from the work vehicle 100. Airflow within the runs 133 may be generated by one or more fan(s) or other source(s) 120 mounted on the rear end 116 of the vehicle 100. The one or more fan(s) or other source(s) 120 provide one or more source(s) of flowing fluid(s) at one or more different pressure(s) as may be necessary and/or desired to carry the one or more different commodities to the row units 101. In some embodiments, a first run structure defines a first run passage configured to receive an associated first fluid flowing from an associated first source 120 at a first pressure, a second run structure defines a second run passage configured to receive an associated second fluid flowing from an associated second source 120 at a second pressure, and a third run structure defines a third run passage configured to receive an associated third fluid flowing from an associated third source 120 at a third pressure.

Additionally, the runs 133 may be operably connected with the metering system 130 such that particles of the commodity metered out by the metering system 130 may be received by selected ones of the runs 133. In some embodiments, the particles may move substantially vertically downward into the selected runs 133. Once in the runs 133, the air stream therein may propel the metered particles away from the work vehicle 100 and toward the row units 101.

In some embodiments, at least one of the runs 133 of the delivery system 132 may be operably connected with a downstream metering system 131. As shown in FIG. 1, the downstream metering system 131 may be supported by the row unit 101. It will be appreciated that a plurality of row units 101 may include respective downstream metering systems 131. Additionally, in some embodiments, some row units 101 may include a respective downstream metering system 131 and others may not. In some embodiments, the downstream metering system 131 may be a singulating metering system that receives commodity via one of the runs 133 and that meters out singulated particles of the commodity therefrom for planting.

Furthermore, the delivery system 132 may include at least one manifold regulator 129 system. The manifold regulator 129 system may be supported by the frame 110 in some embodiments. The manifold regulator 129 system may be operably disposed between the metering system 130 and two or more of the run structures 127, and between the pressure sources 120 and the commodity tanks 128. In some implementations, the manifold regulator 129 system may be configured for selectively changing the pathway for the commodity from a first container through a selected one of the delivery runs 133 by movement of a valve member relative to a body member of a commodity valve, and simultaneously also for automatically delivering pressure to the first container supplying the commodity in accordance with the selected delivery run pathway selected. For example, the manifold regulator 129 system may be manually or automatically moved to select a first position of the valve member relative to the body in which commodity metered from the metering system 130 is payed out from a first commodity container to a first one of the runs 133 for delivery to a respective row unit 101. The manifold regulator system 129 may further be manually or automatically moved to select a second position of the valve member relative to the body in which commodity metered from the metering system 130 is metered out from the first commodity container to a second one of the runs 133 for delivery to a different row unit 101.

Figures 2A, 2B:
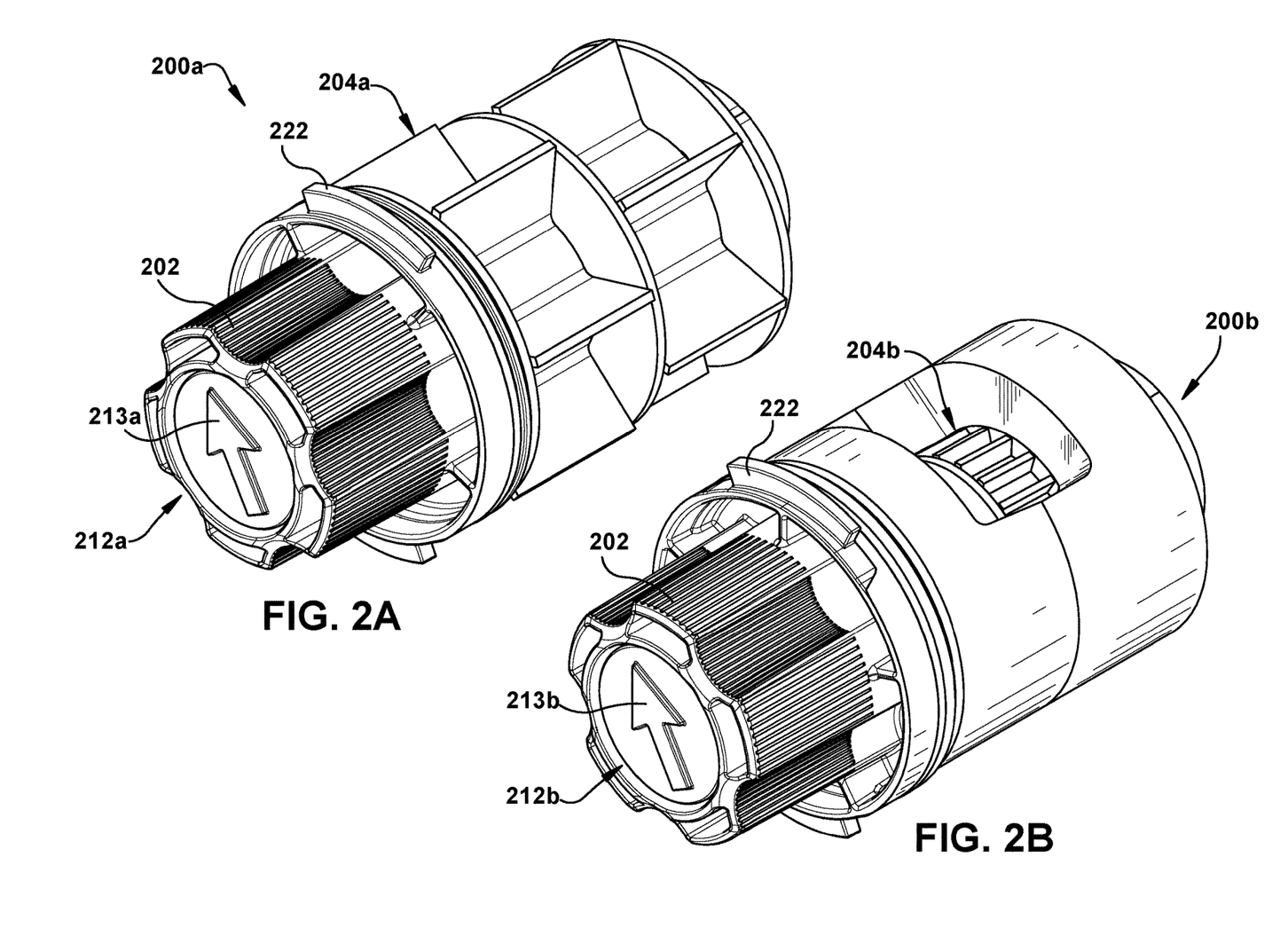
FIGS. 2A, 2B, and 2C are component diagrams illustrating implementations of one or more portions of a metering apparatus that provides visual indication of operation.
Figure 2C:
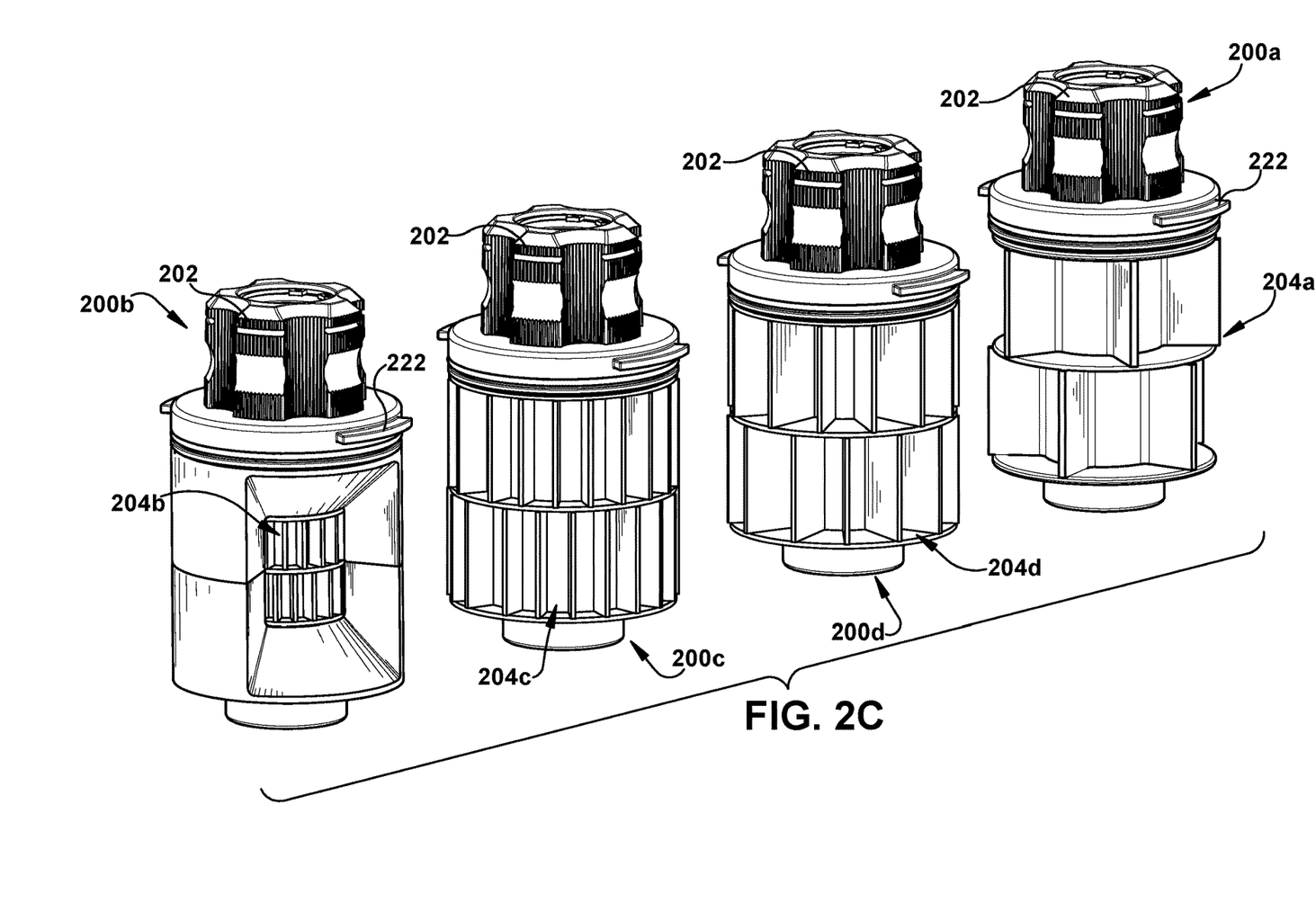

FIGS. 2A, 2B and 2C are component diagrams illustrating perspective views, several example implementations of metering assemblies 200a, 200b, 200c, 200d (generally 200), for operably providing product metering and visual indication of operation. That is, for example, the metering assembly 200 can comprise a roller shape that operably rotates to meter out a commodity (e.g., seed, fertilizer, other granular or pelletized products) from a commodity tank at a desired rate (e.g., predetermined based on the commodity, dispensing system, conditions, and desired results). In this implementation, the metering assembly 200 can comprise a knob 202, a metering element 204 (204a, 204b, 204c, 204d), and an indicator 212. As an example, a metering assembly 200 can be operably disposed in a metering system (e.g., the metering system 130, of FIG. 1) to meter out a target commodity at a desired (e.g., predetermined) rate. For example, respective metering assemblies 200a, 200b, 200c, 200d, comprise differently configured metering elements 204a, 204b, 204c, 204d, that can be selected based on the type and size of commodity (e.g., seed) to be dispensed. Further, the knob can comprise any type of handle or grip that also provides for operably securing the metering assembly to the shaft.

Figure 3A:
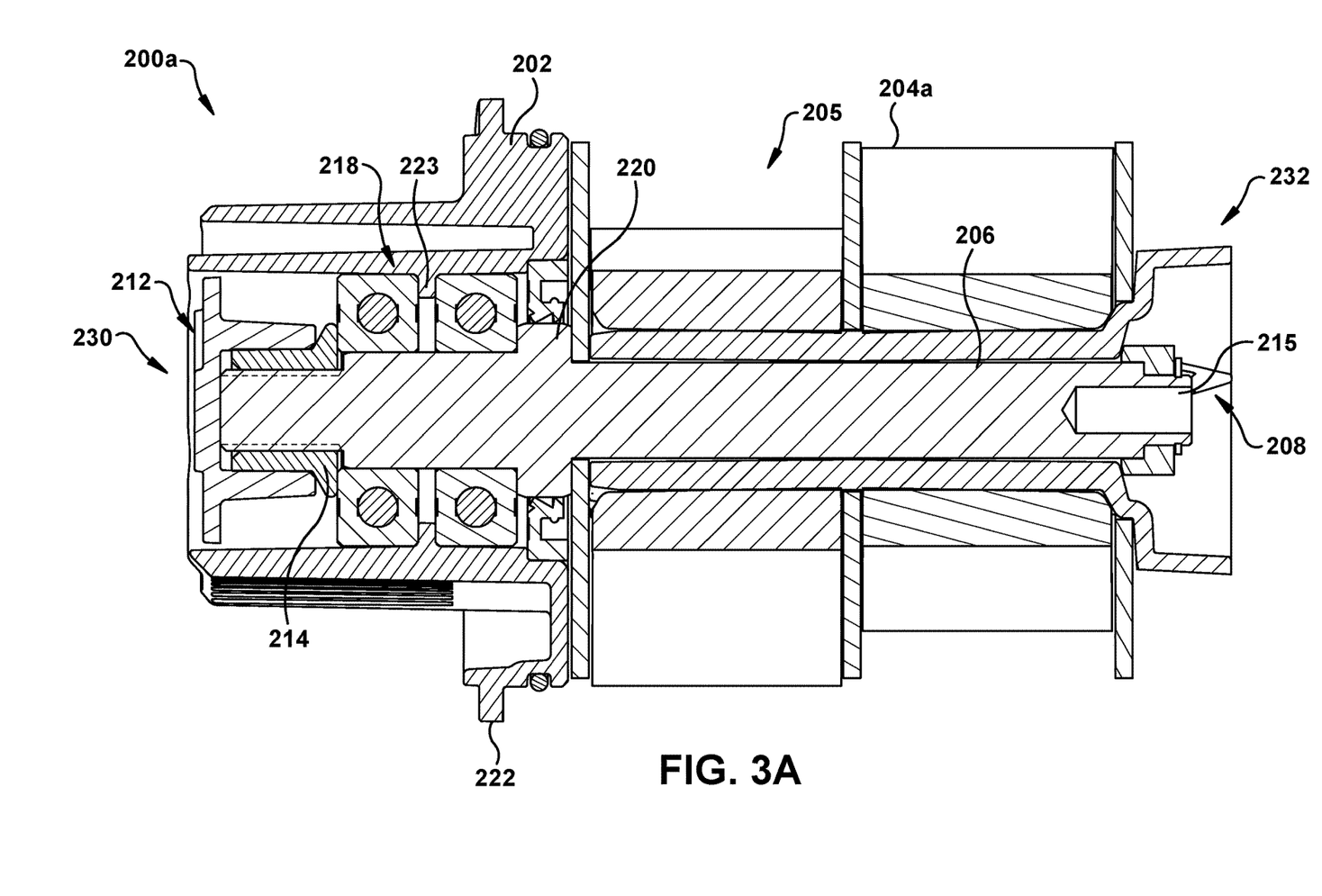
FIGS. 3A and 3B are component diagrams that illustrate cut away views of implementations of one or more portions of example metering apparatuses.
Figure 3B:
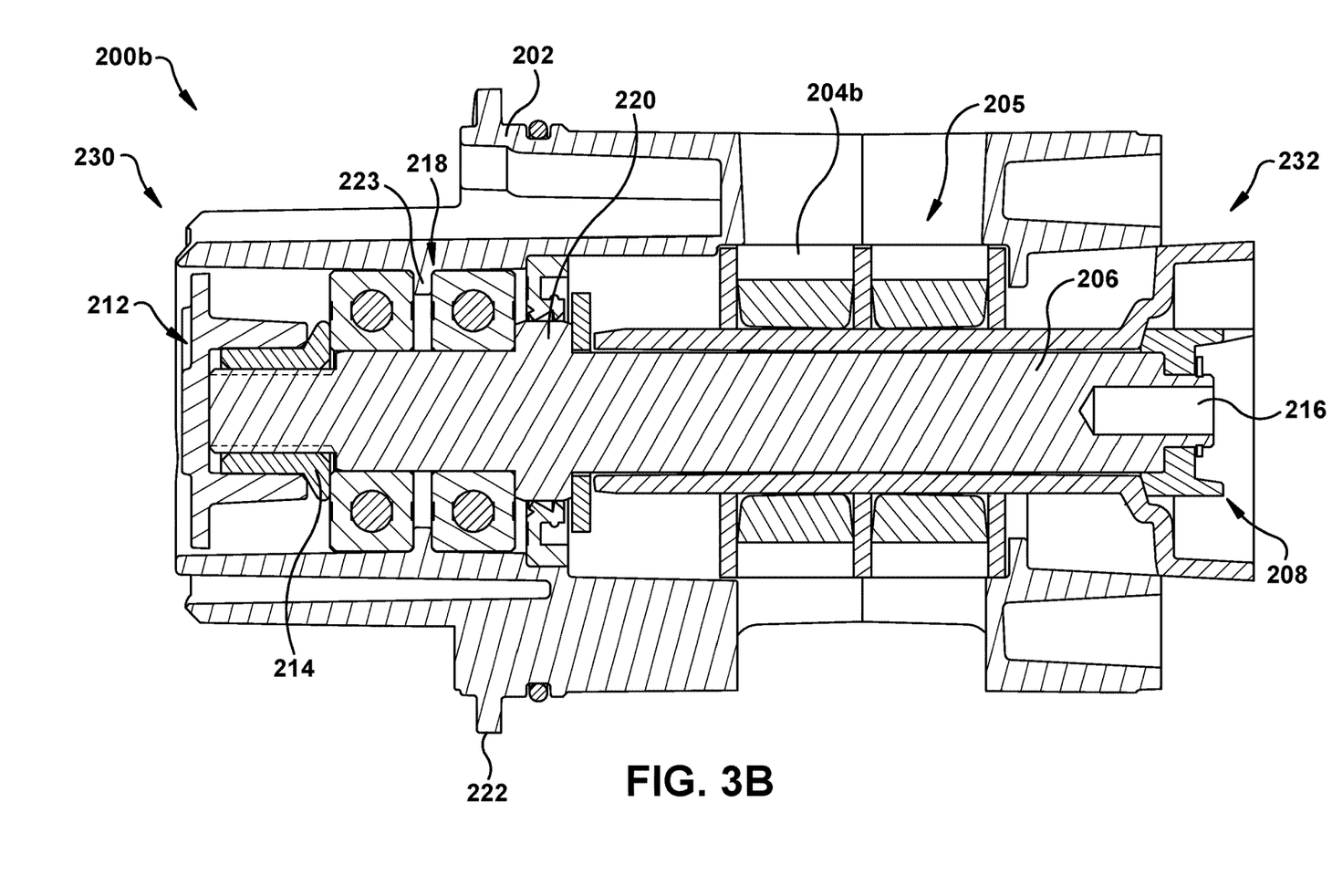

FIGS. 3A and 3B are cutaway views of various example roller assemblies 200a, 200b. With continued reference to FIGS. 2A, 2B, and 2C, in this example, respective assemblies 200 can comprise an implement shaft 206, a coupler 208, and an indicator 212 (212a, 212b). In this implementation, the coupler 208 can be fixedly engaged with the metering element 204 at a rear end 232 (e.g., second end) of the assembly 200. In some implementations, the coupler 208 can be formed with (e.g., or otherwise non-removeably fixed to) the metering element 204. In other implementations, the coupler 208 can be removeably fastened to the metering element 204. As an example, the metering element 204 can comprise one or more compartments 205 that are configured to meter out a commodity from commodity storage, and may be sized, shaped, and configured based on the intended commodity (e.g., seed size, shape, and dispensing rate).

Further, the coupler 208 can be configured to operably engage with a powered motor coupling that is powered by a metering motor (not shown). That is, for example, a metering system (e.g., 130) can comprise one or more motors that provide rotational power. In this example, the motor may provide rotational power to a motor coupling that is operably engaged with the coupler 208. In this way, for example, the motor can provide rotational power to the metering assembly 200. In some implementations, the coupling may comprise teeth, gears, or extensions that meshedly engage with complementary teeth, gears or extensions of the motor coupling. In this implementation, the coupler 208 can be selectably engaged or disengaged from the motor coupling. In this way, the metering assembly 200 may be selectably removed from a metering system, such as for maintenance or to change the metering element 204, and reinstalled.

The shaft 206 is disposed centrally, along a longitudinal axis, of the metering assembly 200. Further, the shaft 206 operably rotates around the longitudinal axis when the coupler 208 is engaged with a motor coupling. At the rear end 232 of the assembly 200, the shaft 206 is operably engaged with the coupler 208 using a rear shaft fastener (not shown). In this implementation, for example, the rear shaft fastener (e.g., second end fastener) can be fastened into the shaft, such as into a cavity 215 in the shaft, and can abut the rear (e.g., second end) of the coupler 208 to hold the rear (e.g., second end) of the shaft 206 at the rear end 232 of the assembly 200. Additionally, the shaft 206 can comprise a forward shoulder 220 which abuts the front (e.g., first end) of the metering element 204. In this way, the rear shaft fastener, when fastened, can bias the front of the metering element 204 against the forward shoulder 220 to provide for operably holding the metering element 204 and shaft 206 in fixed engagement. Therefore, for example, when the shaft 206 rotates the metering element 204 can operably rotate.

At the front (e.g., first end) of the shaft 206, a bearing assembly 218 operably holds the shaft 206 in place, while allowing for rotation within the bearing assembly 218. As an example, the bearing assembly can comprise one or more bearings and/or bushings that allow operable rotation of the shaft 206. At the front end 230 of the assembly 200, the shaft 206 can be held in operable engagement with the bearing assembly 218 using a front shaft fastener 214 (e.g., a fastening nut, or fastening screw). In this implementation, the front shaft fastener 214 operably rotates with the shaft 206 as the shaft 206 rotates. Further, the indicator 212 can comprise a body that may be disposed on the front shaft fastener 214 to operably rotate as the shaft 206 rotates. In some implementations, the indicator 212 can comprise a visual shape, color, pattern, or other arrangement, which, when rotating, provides a visual cue to an observer that the shaft is rotating.

Figure 5A:
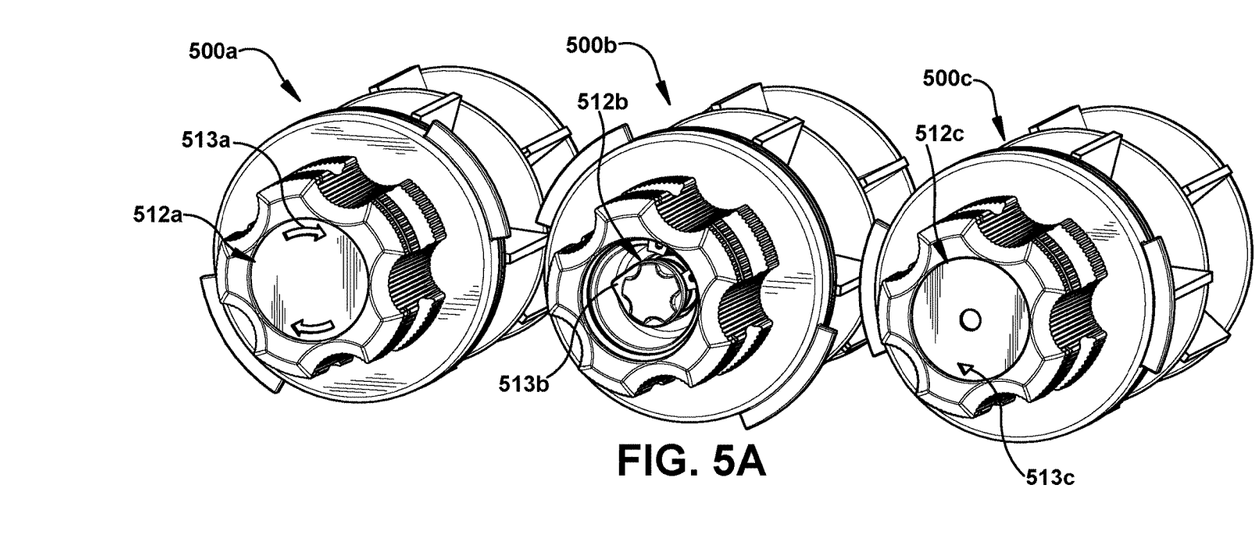
FIGS. 5A and 5B are component diagrams illustrating implementations of one or more portions of one or more systems described herein.
Figure 5B:
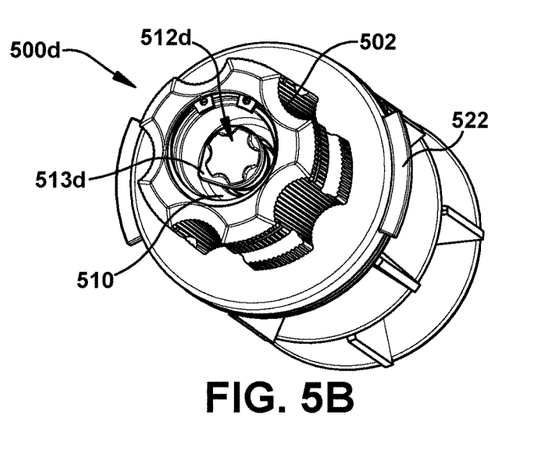

As an illustrative example, FIGS. 5A and 5B, with continued reference to FIGS. 2A and 2B, are component diagrams illustrating one or more portions of one or more systems described herein. In these example implementations, the example, assemblies 200a, 200b, 500a, 500b, 500c, 500d respectively comprise an indicator 212, 512 (212a, 212b, 512a, 512b, 512c, 512d) that can comprise a visual shape, color, pattern, or other arrangement, which, when rotating, provides a visual cue to an observer that the shaft is rotating. As an example, in these implementations, the indicator 212, 512 can comprise a visual indicator 213 (213a, 213b, 513a, 513b, 513c, 513d), such as an arrow, pointer, cutout, or other shape, pattern or color that is used as a visual cue to an observer to provide observable indication of operable rotation. However, it is anticipated that any suitable visual indicator may be utilized on the indicator 212. For example, any suitable shape, color, pattern, or other arrangement can be used to indicate rotation during rotation. In some implementations, the visual indicators 213 may be further colored, painted, or otherwise highlighted for easier recognition.

Returning to FIGS. 3A and 3B, with continued reference to FIGS. 2A, 2B, and 2C, the knob 202 (e.g., a handle or grip that can be operably, selectably secured into the assembly 200) can be disposed at the front end 230 of the metering assembly 200. Further, the knob 202 can comprise one or more engagement fins 222, which are configured to operably engage with a complementary feature on the metering system (e.g., 130). For example, the engagement fin 222 may be disposed on the knob body 202 at a slight angle, such as in a screw thread arrangement, so that it can be threadedly engaged with complementary threads on/in a feeder tube in the metering system. In this way, for example, the knob 202 can provide a selectably fixed engagement for the metering assembly 200 in the metering system.

Additionally, a bearing alignment stop 223 can provide a locator and alignment fixture that allows the bearing assembly 218 to be operably disposed in an appropriate location, and to help retain the bearing assembly 218 in the proper location during operation. In this way, for example, the appropriate location and fixture of the bearing assembly 218 by the alignment stop 223, can help hold the shaft 206 in rotational engagement with the motor coupling through the coupler 208. In some implementations, the bearing alignment stop 223 can help fasten the know 202 in place during operation, as the bearing assembly 218 is biased toward the rear end 232 of the assembly 200 by the front shaft fastener 214 (e.g., first shaft fastener), which may hold the knob 202 in place by the bearing alignment stop 223. Likewise, the engagement fins 222 of the knob 202 can be selectably unthreaded from engagement to release the metering assembly 200.

Figure 4:
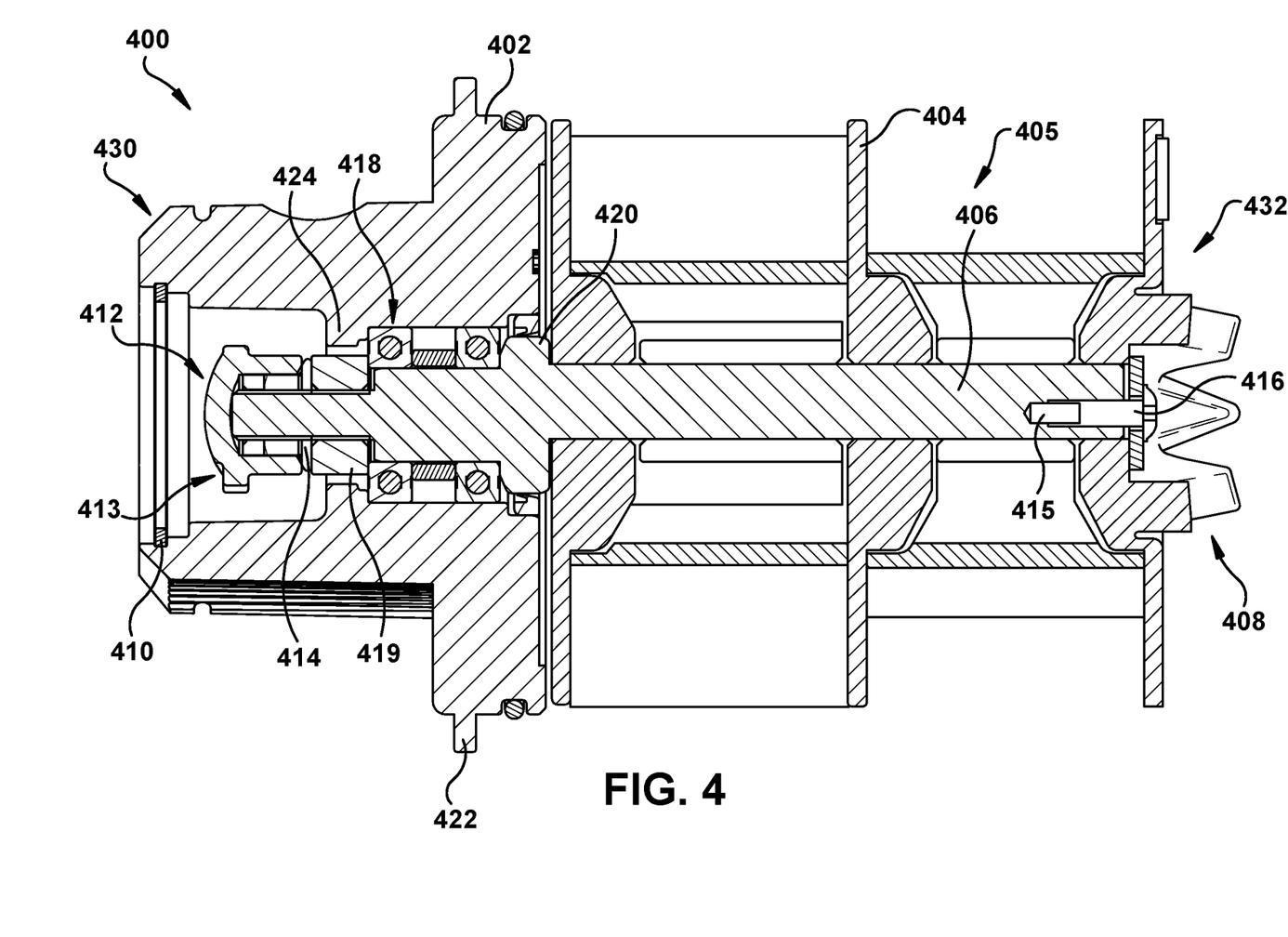
FIG. 4 is a component diagram illustrating one implementation of one or more portions of an alternate example metering apparatus.

FIG. 4 is a component diagram illustrating an alternate implementation of an example metering assembly 400. In this implementation, the example assembly 400 comprises a knob 402, a metering element 404, an implement shaft 406, a coupler 408, and an indicator 412. In some implementations, the knob 402 can comprise a sight cover 410, which can be optically transparent for viewing of a visual indicator 413, and to provide protection from the environment to the shaft 406, and/or a front shaft fastener 414 (e.g., a fastening nut, or fastening screw).

The shaft 406 is disposed centrally, along a longitudinal axis, of the metering assembly 400. Further, the shaft 406 operably rotates around the longitudinal axis when the coupler 408 is engaged with a motor coupling. At the rear end 432 of the assembly 200, the shaft 406 is operably engaged with the coupler 408 using a rear shaft fastener 416. In this implementation, for example, the rear shaft fastener can be fastened into the shaft, such as into a cavity 415 in the shaft, and can abut the rear of the coupler 408 to hold the rear of the shaft 406 at the rear end 432 of the assembly 400. Additionally, the shaft 406 can comprise a forward shoulder 420 which abuts the front of the metering element 404. In this way, the rear shaft fastener 416, when fastened, can bias the front of the metering element 404 against the forward shoulder 420 to provide for operably holding the metering element 404 and shaft 406 in fixed engagement. Therefore, for example, when the shaft 406 rotates the metering element 4204 can operably rotate.

At the front of the shaft 406, a bearing assembly 418 operably holds the shaft 406 in place, while allowing for rotation within the bearing assembly 418. As an example, the bearing assembly can comprise one or more bearings and/or bushings 419 that allow operable rotation of the shaft 406. At the front end 430 of the assembly 400, the shaft 406 can be held in operable engagement with the bearing assembly 418 using the front shaft fastener 414. In this implementation, the front shaft fastener 414 operably rotates with the shaft 406 as the shaft 406 rotates. Further, the indicator 412 can comprise a body that may be disposed on the front shaft fastener 414 to operably rotate as the shaft 406 rotates. In some implementations, the indicator 412 can comprise a visual indicator 413, such as a shape, color, pattern, or other arrangement, which, when rotating, provides a visual cue to an observer that the shaft is rotating. Further, the knob 402 can comprise a front knob shoulder 424 (e.g., first end knob shoulder), which provides a rearward engagement force against the bearing assembly 418, which can hold the shaft 406 in rotational engagement with the motor coupling through the coupler 408.

Figure 6:
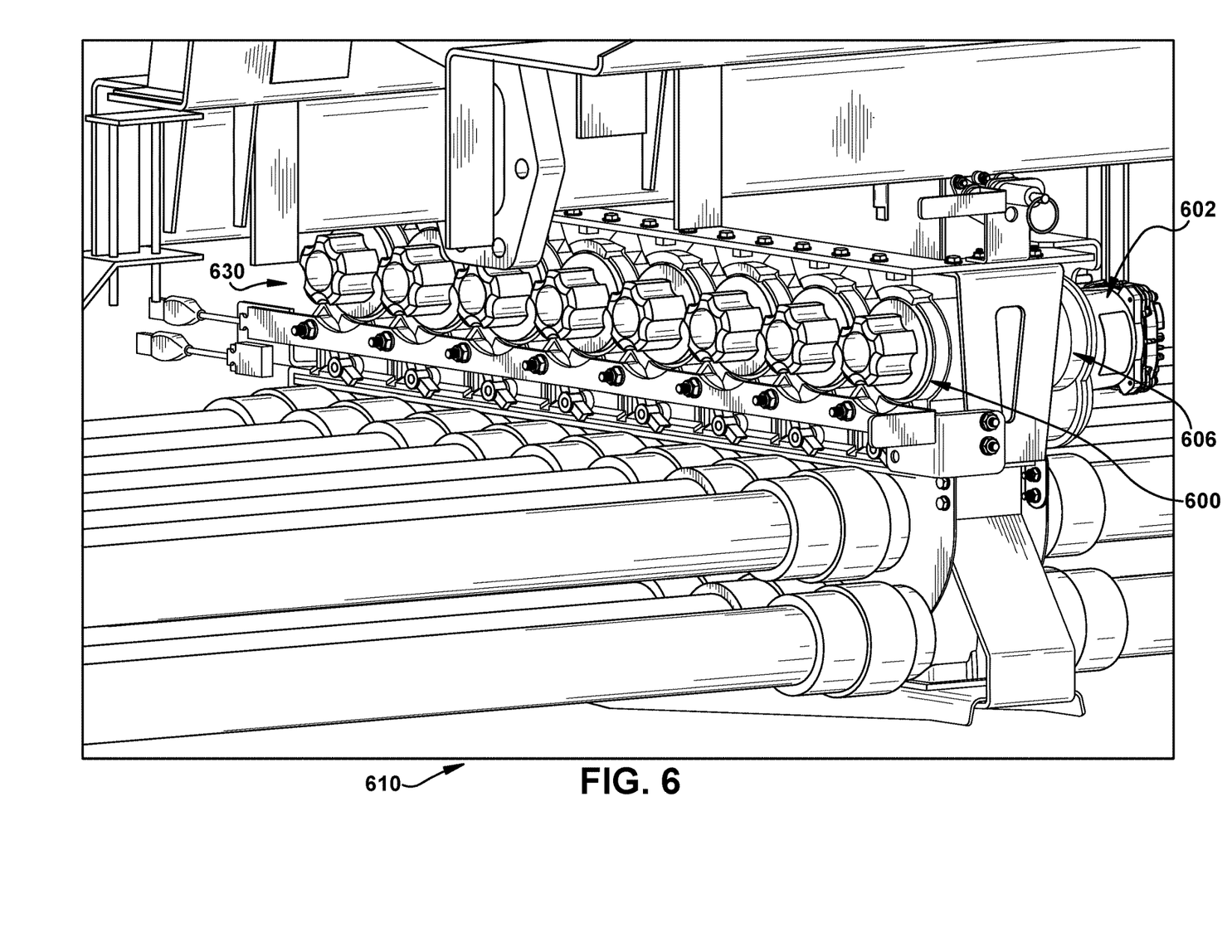
FIG. 6 is a component diagram illustrating one example of an implementation of one or more portions of one or more systems described herein.

FIG. 6 is a component diagrams illustrating one example of how one or more portions of one or more systems described herein may be an implemented. In this example, a plurality of metering assemblies 600 may be operably installed in a metering system 604. The metering system 604 can comprise a plurality of metering tubes 606. In this example, the one or more metering assemblies 600 can be operably disposed in respective metering tubes 606. A metering system 630 can comprise one or more metering tubes 606, which are operably linked (e.g., fluidly) to a hopper comprising the metered component (e.g., seed). In this implementation, respective metering assemblies 600 are operably coupled to a metering motor 602, which operates to rotate the metering element (e.g., 204) in the assembly 600 (e.g., using the coupler). Further, as illustrated, the metering assembly are operably linked to a distribution assembly 610, which can comprise tubes leading to dispensing heads (e.g., planters). In this way, for example, the motor 602 turns the metering element (e.g., 204) in the metering assembly 600, which collects components from the hopper at a desired rate (e.g., according to the particular configuration) and deposits them in the distribution assembly 610 for distribution to the dispensing heads. Further, for example, the respective metering assemblies can each be selectably remove individually by rotating the knob (e.g., counterclockwise) to disengage the engagement fins (e.g., 222) from the metering tubes 606. Additionally, a user may view respective assemblies 600 in operation to identify whether they are rotating, using the visual indicators (e.g., 213).

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A metering assembly for an agricultural implement, comprising:
   a metering element comprising a plurality of compartments that operably meter out a target commodity at a predetermined rate;
   a coupler disposed at a rear end of the metering assembly that operably engages with a motor to receive rotational power;
   a shaft operably, fixedly engaged with the coupler and the metering element that rotates around a longitudinal axis to operably rotate the metering element;
   a rear shaft fastener disposed at the rear end of the metering assembly, the rear shaft fastener selectably fastening the coupler with the shaft;
   a front shaft shoulder disposed at a front end side of the metering element, and engaged with the metering element;
   an indicator operably coupled with the shaft at a front end of the metering assembly, the indicator providing a visual indication of rotation of the shaft during rotation; and
   a knob disposed at the front end of the metering assembly, the shaft operably, rotationally disposed inside the knob at the front end, wherein the knob selectably holds the metering assembly in the agricultural implement during operation.

2. The metering assembly of claim 1, comprising a bearing assembly fixedly disposed in the knob, the shaft operably rotating in the bearing assembly.

3. The metering assembly of claim 2, the knob comprising a front knob shoulder that is engaged with the bearing assembly to operably hold the bearing assembly in the knob.

4. The metering assembly of claim 1, comprising a front shaft fastener that operably hold a front of the shaft in engagement with the knob.

5. The metering assembly of claim 1, the rear shaft fastener applying a forward force to the metering element that fixedly holds the metering element against a forward shaft shoulder disposed on the shaft.

6. The metering assembly of claim 1, the coupler comprising teeth that are configured to meshedly engage with complementary teeth on a motor coupler.

7. The metering assembly of claim 1, the knob comprising a sight cover that is disposed at the front end of the knob, and is optically transparent.

8. The metering assembly of claim 1, the knob comprising engagement threads that are configured to threadedly engage with complementary threads on the agricultural implement to operably hold the metering assembly in the agricultural implement.

9. A metering system for a seeder, comprising:
   a motor that provides rotational power;
   a motor coupling that operably receives rotational power from the motor;
   a metering tube that operably receives a product from a coupled hopper; and
   a metering assembly comprising:
      a coupler operably coupled to the motor coupling to receive the rotational power;
      a shaft operably, fixedly coupled to the coupler at a rear end of the metering assembly;
      a metering element comprising compartments that operably meters out the product, the metering element operably fixedly coupled to the shaft to receive the rotational power;
      a rear shaft fastener disposed at the rear end of the metering assembly, the rear shaft fastener selectably fastening the coupler with the shaft, wherein the rear shaft fastener applies a forward force to the metering element that fixedly holds the metering element against a forward shaft shoulder disposed on the shaft;
      an indicator comprising a body that is engaged with the shaft at a front end of the metering assembly, the indicator configured to operably provide a visual indication of rotation; and
      a knob that is operably, selectably engaged with the metering tube to hold the metering assembly in the metering tube, the shaft operably disposed in the knob in rotational engagement.

10. The system of claim 9, comprising a bearing assembly fixedly disposed in the knob, the shaft operably rotating in the bearing assembly.

11. The system of claim 9, the knob comprising a front knob shoulder that is engaged with the bearing assembly to operably hold the bearing assembly in the knob.

12. The system of claim 9, comprising a front shaft fastener that operably hold a front of the shaft in engagement with the knob.

13. The system of claim 12, the indicator disposed on the front shaft fastener.

14. The system of claim 9, the coupler comprising teeth that are configured to meshedly engage with complementary teeth on a motor coupler.

15. The system of claim 9, the knob comprising engagement threads that are configured to threadedly engage with complementary threads on the seeder to operably hold the apparatus in the seeder.

16. An agricultural seeder, comprising:
   a hopper compartment that operably holds a product to be dispensed;
   a metering tube fluidly coupled with the hopper;
   a motor that operably provides rotational power;
   a motor coupling that receives the rotational power; and
   a metering assembly disposed in the metering tube, comprising:
      a metering element comprising a plurality of compartments that operably meter out the product at a predetermined rate;
      a coupler disposed at a rear end of the metering assembly that operably, meshedly engages with the motor coupling to receive the rotational power;
      a shaft operably fixedly engaged with the coupler using a rear fastener, and fixedly coupled with the metering element using a front shaft shoulder, the shaft operably receiving the rotational power to rotate around a longitudinal axis
      an indicator comprising a body that is operably coupled with the shaft at a front fastener, a the front end of the metering assembly, the indicator providing a visual indication of rotation of the shaft during rotation; and
      a knob disposed at the front end of the metering assembly, and comprising a bearing assembly, the shaft rotationally disposed inside the bearing assembly at the front end, wherein the knob is configured to threadedly engage with the metering tube to operably hold the metering assembly in place.

\* \* \* \* \*